United States Patent
Tang

(10) Patent No.: US 7,948,745 B2
(45) Date of Patent: May 24, 2011

(54) RELEASE MODULE AND COMPUTER HOUSING USING THE SAME

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 96 days.

(21) Appl. No.: 12/546,872

(22) Filed: Aug. 25, 2009

(65) Prior Publication Data

US 2010/0246121 A1 Sep. 30, 2010

(30) Foreign Application Priority Data

Mar. 27, 2009 (CN) .......................... 2009 1 0301193

(51) Int. Cl.
*G06F 1/16* (2006.01)
(52) U.S. Cl. ............. 361/679.27; 248/552; 292/215; 312/263; 439/607.3
(58) Field of Classification Search .............. 248/314, 248/309.1, 552, 460; 292/164, 174, 111, 292/215, 99, 201; 312/223.2, 263, 257.1, 248, 205; 361/679.58, 679.32, 679.17, 679.27, 679.57, 679.37, 679.21, 679.23, 679.48; 439/540.1, 649, 607.3, 160, 557

See application file for complete search history.

(56) References Cited

U.S. PATENT DOCUMENTS

| 6,870,731 | B2 * | 3/2005 | Lin et al. .................. 361/679.58 |
| 2002/0089818 | A1 * | 7/2002 | Chen ............................. 361/683 |
| 2003/0011972 | A1 * | 1/2003 | Koo ............................... 361/681 |
| 2008/0239646 | A1 * | 10/2008 | Chen et al. ..................... 361/683 |

* cited by examiner

*Primary Examiner* — Hung V Duong
(74) *Attorney, Agent, or Firm* — Clifford O. Chi

(57) ABSTRACT

A computer housing includes a main body, a panel, a latch piece, and a release member. The main body defines a latch hole. The panel has a hook on a first side thereof. The latch piece is positioned on a second side of the panel and defines a receiving hole therein. The release member is positioned on the main body and forms a latch protrusion. The hook is received in the latch hole of the main body. The latch protrusion engages with the receiving hole such that the panel is locked to the main body. The release member is deformable so that the latch protrusion disengages from the receiving hole.

13 Claims, 4 Drawing Sheets

RELEASE MODULE AND COMPUTER HOUSING USING THE SAME

BACKGROUND

1. Technical Field

The present invention relates to a release module and a computer housing using the same.

2. Description of the Related Art

A typical computer housing includes a main body and a panel positioned on the main body to prevent dust and light from entering the computer housing. A plurality of hooks is formed on an inner side of the panel. A latch protrusion is formed on an end of each hook. A plurality of latch holes is defined in the main body to engage the hooks.

During assembly, the hooks of the panel align with the latch holes of the main body, and external force applied to the panel impels the hooks into the latch holes of the main body. The latch protrusions of the hooks of the panel abut edges of the latch holes of the main body, fixing the panel thereto.

Detachment of the panel from the front of the main body requires external force to eject the latch protrusions of the panel out of the latch holes of the main body one by one, which is inconvenient.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
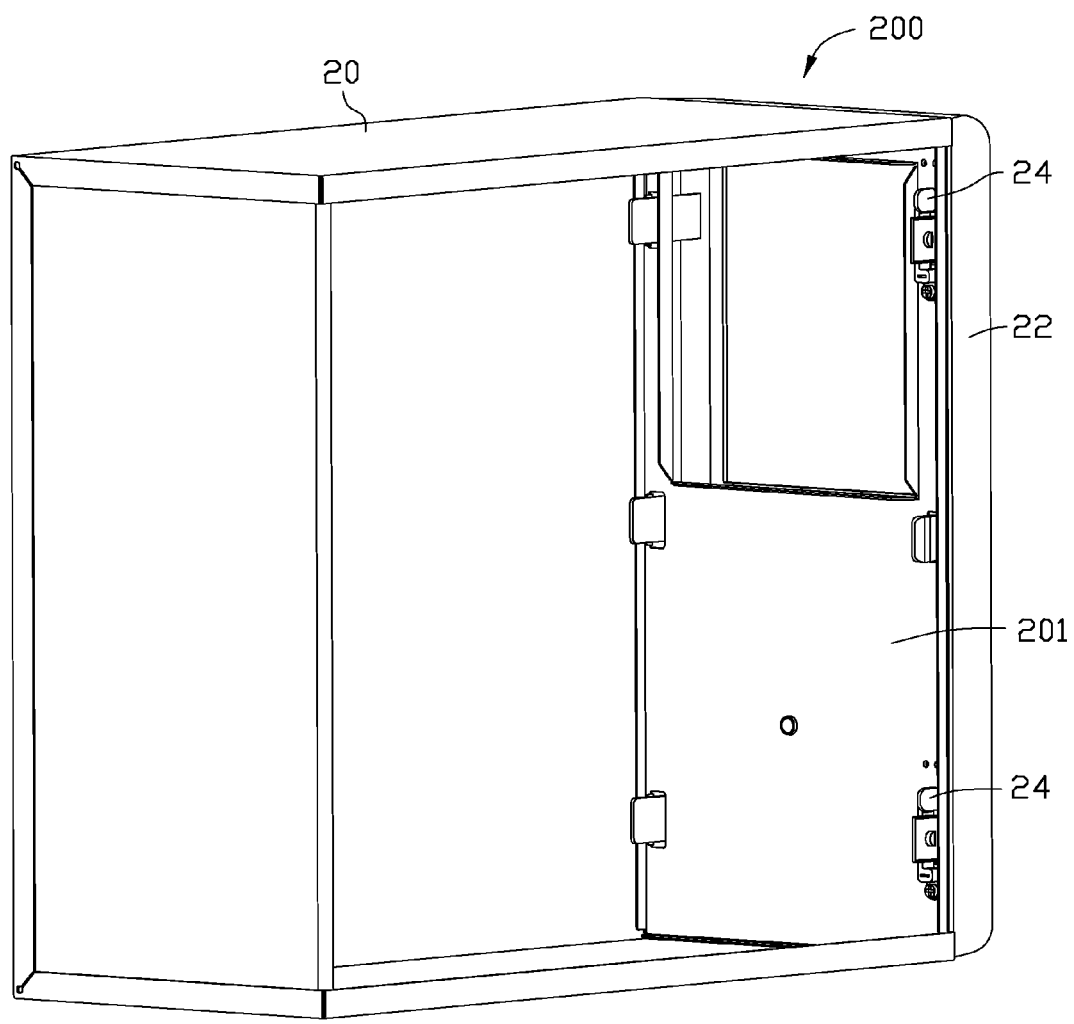
FIG. 1 is an isometric view of an embodiment of a computer housing.
Figure 2:
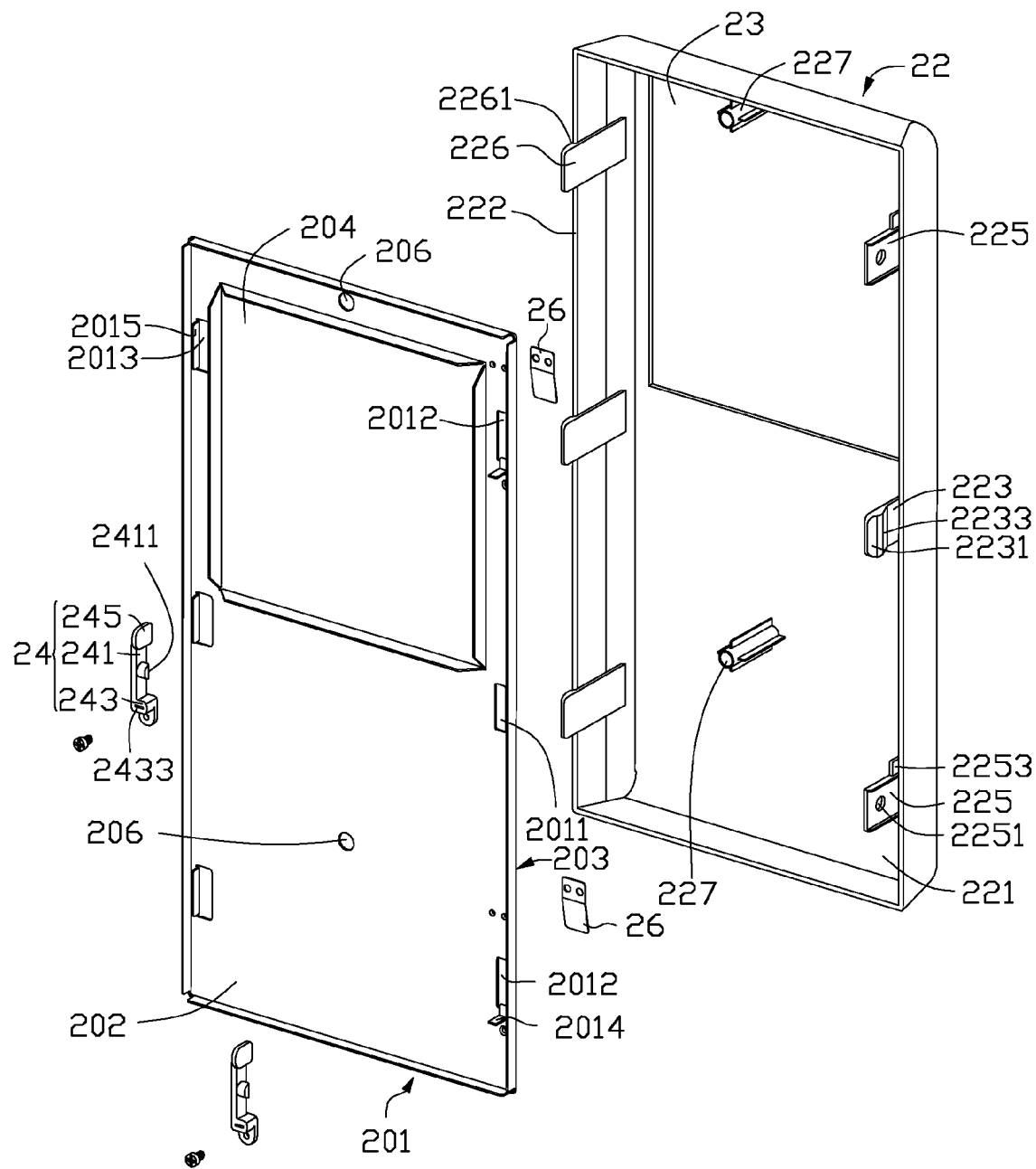
FIG. 2 is an exploded isometric view of the computer housing in FIG. 1, which includes two release members, a panel, and a front cover.

Referring to FIGS. 1 and 2, an embodiment of a computer housing 200 includes a main body 20, a panel 22, two release members 24, and two resilient members 26. The main body 20 includes a front cover 201.

Figure 3:
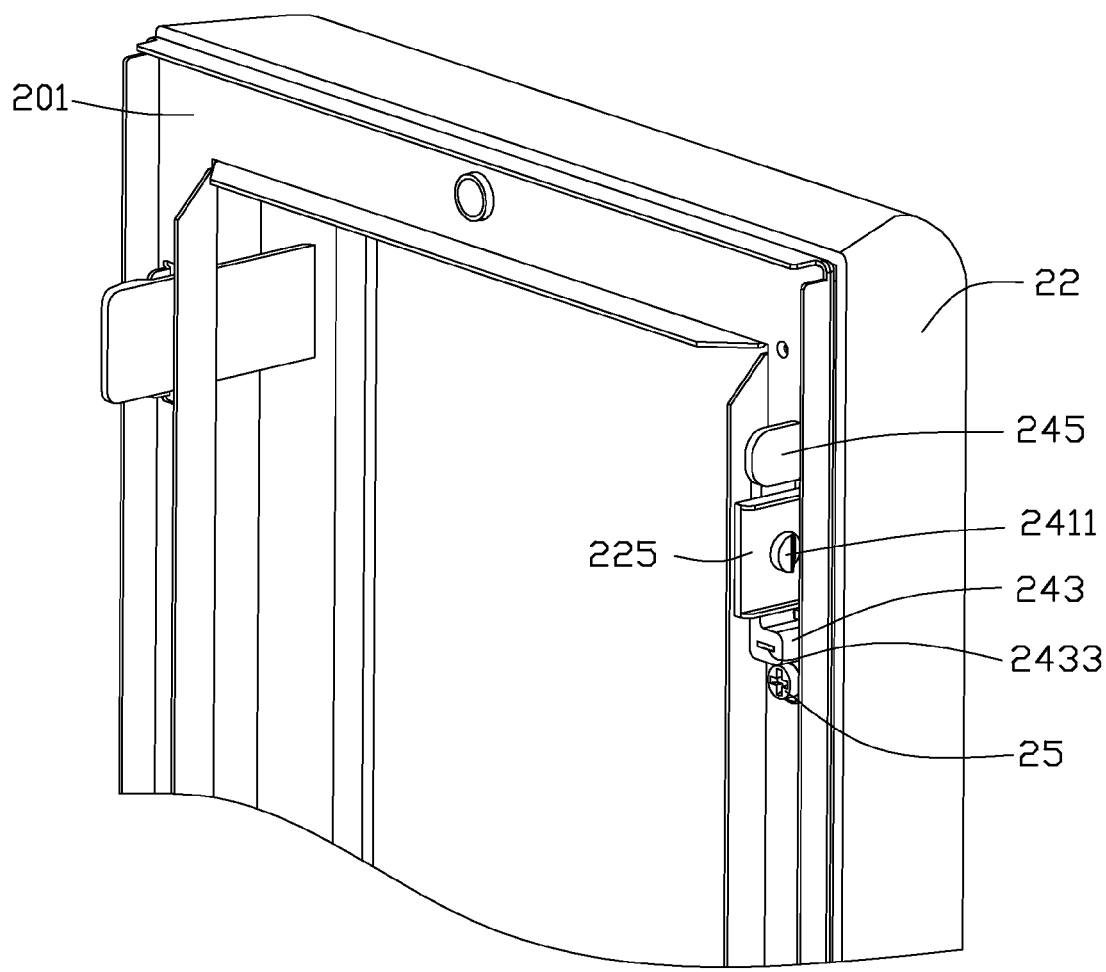
FIG. 3 is a partially enlarged view of the computer housing in FIG. 1 after the release members have fixed the panel to the front cover.
Figure 4:
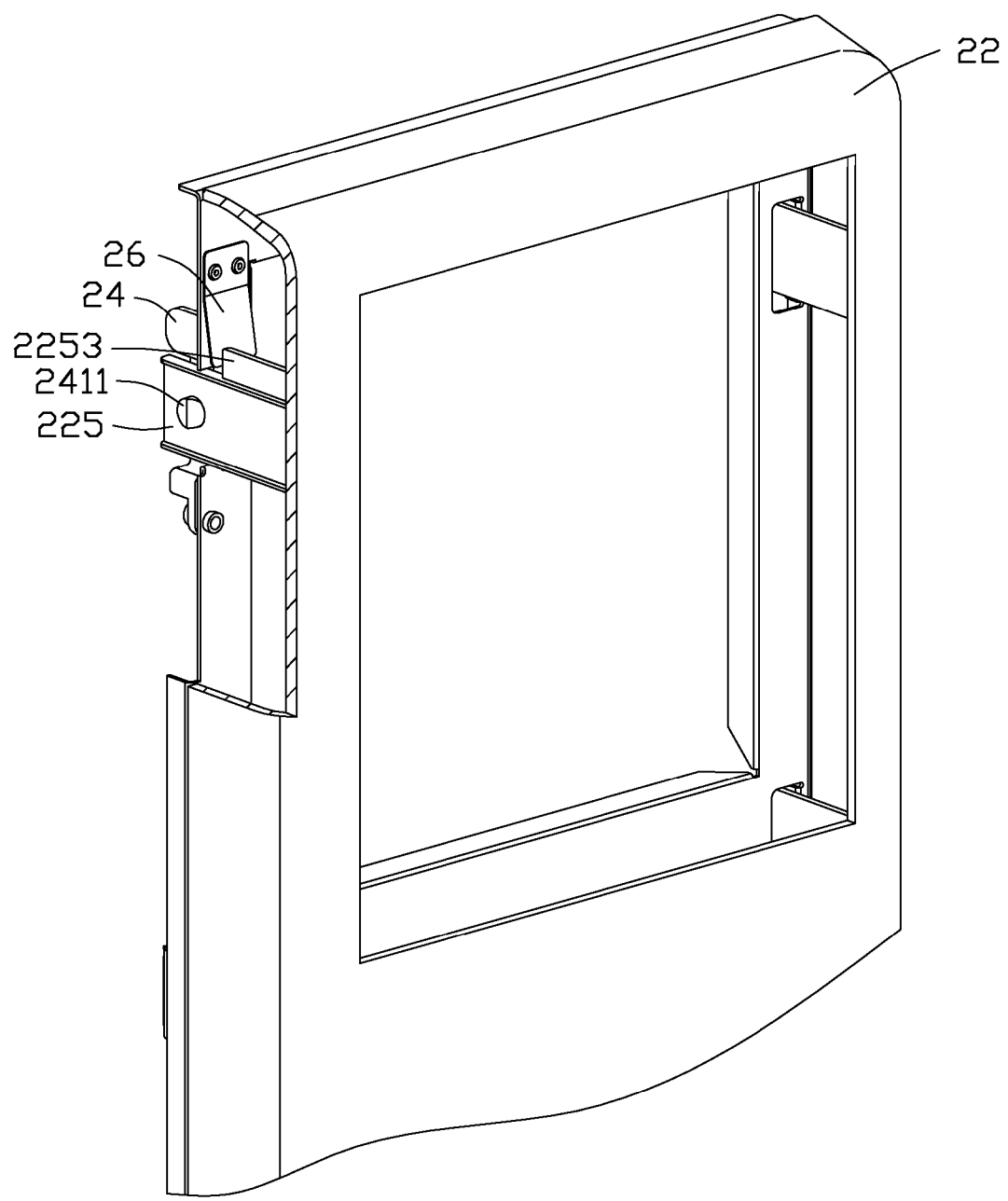
FIG. 4 is a partially enlarged view of a cross section of FIG. 3.

Referring also to FIGS. 3 and 4, the panel 22 may be substantially rectangular. The panel 22 includes a base 221 and four sidewalls 222 extending from a periphery of the base 221. The base 221 and the sidewalls 222 cooperatively define a substantially rectangular cavity (not labeled). An opening 23 is defined in the base 221. A position piece 223, two latch pieces 225, three hooks 226, and two position posts 227 are formed on the base 221. The position piece 223 and the latch pieces 225 are positioned on a first side of the base 221, and the hooks 226 are positioned on a second side opposite to the first side of the base 221. The position piece 223, the latch pieces 225, and the hooks 226 extend beyond the sidewalls 222.

The position piece 223 is between the latch pieces 225. A position protrusion 2231 is formed on an end of the position piece 223. An angled surface 2233 is formed on the position protrusion 2231 of the panel 22.

A receiving hole 2251 is formed on an end of each latch piece 225. In the illustrated embodiment, the receiving hole 2251 is a through hole. Additionally, a resisting portion 2253 is formed on a side of each latch piece 225. A latch tab 2261 is formed on an end of each hook 226.

The shape of the front cover 201 corresponds to a shape of the panel 22. The front cover 201 includes a first surface 202 and a second surface 203 opposite to the first surface 202. A receiving opening 204 is defined in the front cover 201 corresponding to the opening 23 of the panel 22. Two position holes 206, a through hole 2011, two receiving slots 2012, and three latch holes 2013 are defined in the front cover 201. The position holes 206 receive the position posts 227 of the panel 22. The through hole 2011 receives the position piece 223. The receiving slots 2012 receive the latch pieces 225. The latch holes 2013 receive the hooks 226. A periphery of each receiving slot 2012 forms a position piece 2014 on the first surface 202 of the front cover 201, and a periphery of each latch hole 2013 forms a bending portion 2015.

Each release member 24 includes a main portion 241, an assembly portion 243, and a contact portion 245. The main portion 241 is elongated. The assembly portion 243 and the contact portion 245 extend from opposite ends of the main portion 241 respectively. Additionally, a latch protrusion 2411 is formed on the main portion 241. An anti-rotation hole 2433 is defined in the assembly portion 243 corresponding to the position pieces 2014 of the front cover 201.

During assembly, the resilient members 26 are fixed on the second surface 203 of the front cover 201 adjacent to the receiving slots 2012 such that the resilient members 26 resist the resisting portions 2253 of the latch pieces 225.

The opening 23 of the panel 22 aligns with the receiving opening 204 of the front cover 201, and the position posts 227 of the panel 22 align with the position holes 206 of the front cover 201. An external force applied on the panel 22 impels the position posts 227 to be received in the position holes 206. The hooks 226 deform and pass through the latch holes 2013, the latch protrusions 2261 resist a top of the bending portion 2015, so that the hooks 226 of the panel 22 are received in the latch holes 2013 of the front cover 201.

The latch pieces 225 of the panel 22 pass through the receiving slots 2012 of the front cover 201 so that the receiving holes 2251 of the panel 22 protrude out of the first surface 202 of the front cover 201, and the position piece 223 deforms and passes through the through hole 2011 of the front cover 201. The position protrusion 2231 of the position piece 223 resists a periphery of the through hole 2011 so that the position piece 223 is fixed in the through hole 2011 of the front cover 201.

The release members 24 are fixed to the first surface 202 of the front cover 201 by the fasteners 25 such that the position pieces 2014 are received in the anti-rotation holes 2433 of the release members 24 and the latch protrusions 2411 of the release members 24 are received in the receiving holes 2251 of the panel 22, and the panel 22 is fixed to the front cover 201.

An external force applied on the contact portions 245 of the release members 24 deforms the main portions 241 of the release members 24 such that the latch protrusions 2411 of the release members 24 disengage from the receiving holes 2251 of the panel 22. Simultaneously, the resilient members 26 resist the latch pieces 225 and the position piece 223 disengages from the through hole 2011 of the front cover 201.

When a side of the panel 22 adjacent to the position piece 223 is pulled, the position piece 223 deforms and disengages from the through hole 2011 of the front cover 201, the panel 22 rotates relative to a side adjacent to the hooks 226 so that the hooks 226 disengage from the latch holes 2013 of the front cover 201, and the panel 22 is detachable.

The position pieces 2014 prevent the release members 24 from rotating even if the fasteners 25 are abraded.

It can be understood that the position piece 223 may be omitted.

It can be understood that a sliding angled surface may be formed on the latch protrusion 2411 of the release members 24 adjacent to the panel 22.

It can be further understood that the latch protrusions 2411 may be formed on the latch pieces 225, and the receiving holes defined in the release members 24.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. A computer housing comprising:
a main body defining at least one latch hole;
a panel comprising at least one hook on a first side thereof;
at least one latch piece positioned on a second side of the panel and defining a receiving hole therein; and
at least one release member positioned on the main body and forming a latch protrusion, wherein the at least one hook is received in the at least one latch hole of the main body; the latch protrusion engages with the receiving hole such that the panel is locked to the main body, and the at least one release member is deformable so that the latch protrusion disengages from the receiving hole.

2. The computer housing of claim 1, wherein the main body comprises a front cover in which the at least one latch hole is defined, and on which the at least one release member is positioned.

3. The computer housing of claim 2, wherein the at least one release member comprises an elongated main portion, an assembly portion, and a contact portion; the assembly portion and the contact portion extend from opposite ends of the main portion respectively; the latch protrusion is formed on the main portion; the assembly portion is fixed to the front cover; the main portion is deformable such that the latch protrusion disengages from the receiving hole.

4. The computer housing of claim 3, wherein the at least one release member further defines an anti-rotation hole receiving a position piece formed by the front cover.

5. The computer housing of claim 2, wherein the front cover defines a plurality of latch holes to receive the hooks and a plurality of receiving slots to receive the at least one latch piece, wherein the at least one hook is received in the latch holes, and the at least one latch piece is received in the receiving slot and engages with the at least one release member.

6. The computer housing of claim 5, wherein a latch tab is formed on an end of each hook, and a periphery of each latch hole forms a bending portion; tops of the bending portions resist the latch tabs.

7. The computer housing of claim 6, wherein the computer housing further comprises a position piece adjacent the at least one latch piece on an end of which a position protrusion is formed; the front cover defines a through hole corresponding to the position piece; the position protrusion resists a periphery of the through hole of the front cover.

8. The computer housing of claim 2, further comprising a resilient member and a resisting portion formed on the at least one latch piece, wherein the resilient member resists the resisting portion of the at least one latch piece.

9. A release module for a computer housing comprising:
a main body defining at least one latch hole;
a panel comprising at least one hook on a first side thereof;
at least one latch piece positioned on a second side of the panel and defining a receiving hole thereof; and
at least one release member positioned on the main body and forming a latch protrusion, wherein the at least one hook is received in the at least one latch hole of the main body; the latch protrusion engages the receiving hole such that the panel is locked to the main body, and the at least one release member is deformable so that the latch protrusion disengages from the receiving hole.

10. The release module of claim 9, wherein the main body comprises a front cover in which the at least one latch hole is defined, and on which the at least one release member is positioned.

11. The release module of claim 10, wherein the at least one release member comprises an elongated main portion, an assembly portion, and a contact portion; the assembly portion and the contact portion extend from opposite ends of the main portion respectively; the latch protrusion is formed on the main portion; the assembly portion is fixed to the front cover; the main portion is deformable such that the latch protrusion disengages from the receiving hole.

12. The release module of claim 11, wherein the at least one release member further defines an anti-rotation hole receiving a position piece formed by the front cover.

13. A computer housing comprising:
a main body comprising a front cover defining three latch holes;
a panel comprising three hooks on a first side thereof;
two latch pieces positioned on a second side of the panel, each latch piece defining a receiving hole therein; and
two release members positioned on the main body, each release member forming a latch protrusion, wherein the three hooks are received in the three latch holes of the main body; the latch protrusions of the release member engage with the receiving holes of the latch pieces such that the panel is locked to the main body; the release members are deformable so that the latch protrusions disengage from the receiving holes.

* * * * *